United States Patent
Yoo et al.

(10) Patent No.: US 10,144,420 B2
(45) Date of Patent: Dec. 4, 2018

(54) METHOD AND APPARATUS FOR CONTROLLING PATH OF AUTONOMOUS DRIVING SYSTEM

(71) Applicant: HYUNDAI MOTOR COMPANY, Seoul (KR)

(72) Inventors: Su Jung Yoo, Incheon (KR); Dong Hwi Lee, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 197 days.

(21) Appl. No.: 15/240,504

(22) Filed: Aug. 18, 2016

(65) Prior Publication Data
US 2017/0166204 A1    Jun. 15, 2017

(30) Foreign Application Priority Data
Dec. 11, 2015 (KR) .................. 10-2015-0177382

(51) Int. Cl.
*G01C 22/00* (2006.01)
*B60W 30/095* (2012.01)
(Continued)

(52) U.S. Cl.
CPC ........ *B60W 30/0956* (2013.01); *B60W 30/09* (2013.01); *B60W 30/095* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 6,926,374 B2 * | 8/2005 | Dudeck ..................... | B60T 7/22 303/191 |
| 7,684,921 B2 * | 3/2010 | Kojima .............. | B60K 31/0058 180/167 |

(Continued)

FOREIGN PATENT DOCUMENTS

| | | |
|---|---|---|
| JP | 11-348598 A | 12/1999 |
| JP | 2002-092795 A | 3/2002 |

(Continued)

*Primary Examiner* — Khoi H Tran
*Assistant Examiner* — Jorge O Peche
(74) *Attorney, Agent, or Firm* — McDermott Will & Emery LLP

(57) ABSTRACT

A method for controlling a path of an autonomous driving system includes: determining whether or not an obstacle and an autonomously driven vehicle will collide when a sensor detects an obstacle in a proximity of the vehicle while the vehicle is being autonomously driven; generating a plurality of path candidates within a path generation region when it is determined that the detected obstacle and the vehicle will collide; determining whether or not an expansion of the path generation region is possible, expanding the path generation region when it is possible, and regenerating the plurality of path candidates within the expanded path generation region when there is no path candidate in which the collision between the obstacle and the vehicle does not occur; and selecting a path from among the path candidates in which the collision between the obstacle and the vehicle does not occur.

9 Claims, 6 Drawing Sheets

(51) Int. Cl.
    *B60W 30/09*    (2012.01)
    *G05D 1/00*     (2006.01)
    *G05D 1/02*     (2006.01)
    *G08G 1/16*     (2006.01)
    *B62D 15/02*    (2006.01)
    *G06K 9/00*     (2006.01)

(52) U.S. Cl.
    CPC ......... *B62D 15/02* (2013.01); *B62D 15/0265* (2013.01); *G05D 1/0088* (2013.01); *G05D 1/0214* (2013.01); *G06K 9/00791* (2013.01); *G08G 1/16* (2013.01); *B60W 2550/10* (2013.01); *B60W 2720/103* (2013.01); *B60W 2750/30* (2013.01)

(56) References Cited

U.S. PATENT DOCUMENTS

| | | | | |
|---|---|---|---|---|
| 9,227,632 | B1* | 1/2016 | Lee | B60W 30/0953 |
| 9,229,453 | B1* | 1/2016 | Lee | G05D 1/0214 |
| 9,457,807 | B2* | 10/2016 | Lee | B60W 30/09 |
| 9,587,952 | B1* | 3/2017 | Slusar | G06Q 10/00 |
| 9,726,505 | B2* | 8/2017 | Manoliu | G01C 21/32 |
| 9,731,718 | B2* | 8/2017 | Sakai | B60W 30/09 |
| 9,816,827 | B1* | 11/2017 | Slusar | G06Q 10/00 |
| 9,873,427 | B2* | 1/2018 | Danzl | B60K 28/06 |
| 9,944,283 | B2* | 4/2018 | Kindo | G05D 1/0088 |
| 2006/0085131 | A1* | 4/2006 | Yopp | B60W 30/085 701/301 |
| 2008/0243389 | A1* | 10/2008 | Inoue | G08G 1/165 701/301 |
| 2008/0303696 | A1* | 12/2008 | Aso | G08G 1/161 340/935 |
| 2009/0182505 | A1* | 7/2009 | Ikeda | G01S 13/931 701/301 |
| 2010/0106356 | A1* | 4/2010 | Trepagnier | G01S 17/023 701/25 |
| 2010/0121576 | A1* | 5/2010 | Aso | G01S 13/726 701/301 |
| 2012/0072104 | A1* | 3/2012 | Sakai | B60W 30/09 701/400 |
| 2014/0200801 | A1* | 7/2014 | Tsuruta | B60W 30/00 701/400 |
| 2015/0246678 | A1* | 9/2015 | Hauler | B62D 1/28 701/25 |
| 2016/0129907 | A1* | 5/2016 | Kim | B60W 30/09 701/26 |
| 2016/0180713 | A1* | 6/2016 | Bernhardt | B66F 17/003 701/70 |
| 2016/0200317 | A1* | 7/2016 | Danzl | B60K 28/06 701/25 |
| 2017/0015312 | A1* | 1/2017 | Latotzki | B60W 30/06 |
| 2017/0039865 | A1* | 2/2017 | Takabayashi | G08G 1/166 |
| 2017/0102707 | A1* | 4/2017 | Reichel | B60W 30/095 |
| 2017/0166204 | A1* | 6/2017 | Yoo | B60W 30/09 |
| 2017/0212513 | A1* | 7/2017 | Iida | B60W 50/02 |
| 2017/0334442 | A1* | 11/2017 | Sakai | B60W 30/09 |
| 2018/0029604 | A1* | 2/2018 | Niino | G08G 1/052 |

FOREIGN PATENT DOCUMENTS

| | | |
|---|---|---|
| JP | 2008-242544 A | 10/2008 |
| JP | 2008-305014 A | 12/2008 |
| JP | 2009-166691 A | 7/2009 |
| JP | 2014-136480 A | 7/2014 |
| KR | 10-2012-0137025 A | 12/2012 |

* cited by examiner

METHOD AND APPARATUS FOR
CONTROLLING PATH OF AUTONOMOUS
DRIVING SYSTEM

CROSS-REFERENCE TO RELATED
APPLICATION

This application claims the benefit of priority to Korean Patent Application No. 10-2015-0177382, filed on Dec. 11, 2015 in the Korean Intellectual Property Office, the entirety of which is incorporated herein by reference.

TECHNICAL FIELD

The present disclosure relates to a method and an apparatus for controlling a path of a vehicle using an autonomous driving system.

BACKGROUND

An autonomous driving system refers to a system that automatically drives a vehicle to a predefined destination without depending on the control of a driver. The autonomous driving system is capable of recognizing external road conditions as well as the state of the vehicle.

The autonomous driving system generates an autonomous driving path for the vehicle based on the external road conditions and the state of vehicle, and controls the vehicle according to a generated path to drive the vehicle. Here, a process for generating a path includes sensing a change of an obstacle in real time, and generating an avoidance path in accordance with the sensed change.

Since the avoidance path is generated in response to a change in a position of the obstacle, it is an object of the present disclosure to provide a method for avoiding an unsafe path by evaluating a change in behavior characteristics of the vehicle and/or road situations.

Therefore, a method for generating and selecting an avoidance path by reflecting kinematics behavior characteristics of the vehicle and the road situations in real time is required.

SUMMARY

The present disclosure has been made to solve the above-mentioned problems occurring in the prior art while advantages achieved by the prior art are maintained intact.

An aspect of the present disclosure provides a method and an apparatus for controlling a path of an autonomous driving system capable of generating and selecting an avoidance path by considering road conditions and behavior characteristics of a vehicle which are varied in real time as well as a state of an obstacle.

According to an exemplary embodiment of the present disclosure, a method for controlling a path of an autonomous driving system includes steps of: determining whether or not an obstacle and an autonomously driven vehicle will collide with each other when a sensor detects an obstacle in a proximity of the vehicle while the vehicle is being autonomously driven along a reference path; generating a plurality of path candidates within a path generation region of a road on which the vehicle is being driven when it is determined that the detected obstacle and the vehicle will collide with each other; determining whether or not an expansion of the path generation region is possible based on a road environment, expanding the path generation region, and regenerating the plurality of path candidates within the expanded path generation region when there is no path candidate in which the collision between the obstacle and the vehicle does not occur among the plurality of path candidates; and selecting a path from among the path candidates in which the collision between the obstacle and the vehicle does not occur when there are path candidates in which the collision between the obstacle and the vehicle does not occur among the plurality of path candidates.

In determining whether or not the expansion of the path generation region is possible, it may be determined based on at least one of a lane adjacent to an outer region of a lane of a road on which the vehicle is being driven and a road structure exceeding a preset reference value.

In the step of expanding the path generation region, a path generation width may be determined in relation to inside as much as a half (½) of a vehicle width from an outer boundary line of the expandable region, and the path generation region may be expanded as much as the determined path generation width.

The step of selecting any one path of the path candidates to allow the vehicle to be driven along the selected path may include selecting a path having the lowest degree of collision risk between the obstacle and the vehicle among the path candidates in which the collision does not occur.

The method may further include, after the step of selecting any one path of the path candidates to allow the vehicle to be driven along the selected path, steps of: calculating a collision prediction width between the vehicle and the obstacle; determining a velocity adjustment ratio of the vehicle to be proportional to the collision prediction width; determining a target velocity of the vehicle by applying the determined velocity adjustment ratio to a set velocity of the vehicle; and generating a velocity profile based on the target velocity of the vehicle.

The method may further include a step of adjusting the set velocity of the vehicle according to the velocity profile while the vehicle passes around the obstacle.

The method may further include, after the step of regenerating the plurality of path candidate groups, a step of setting the obstacle as a target when there is no path candidate in which the collision between the obstacle and the vehicle does not occur among the plurality of path candidates, and maintaining the reference path which is currently being driven as a driving path of the vehicle.

The method may further include, in the step of setting the obstacle as the target, a virtual position-fixed target corresponding to the obstacle being generated and disposed at a position of the obstacle, and the virtual position-fixed target may be set as the target.

In the step of setting the obstacle as the target, a virtual position-fixed target corresponding to the obstacle may be generated and disposed at the position of the obstacle, and the virtual position-fixed target may be set as the target.

According to another exemplary embodiment of the present disclosure, an apparatus for controlling a path of an autonomous driving system includes: a collision determining device configured to determine whether or not a detected obstacle and a vehicle will collide with each other when a sensor sensing an obstacle in a proximity of the vehicle detects the obstacle while the vehicle is autonomously driven along a reference path, and determining whether or not the obstacle and the vehicle will collide with each other based on each of a plurality of path candidates generated within a road on which the vehicle is being driven; a path generator configured to generate a plurality of path candidates within a path generation region of the road on which the vehicle is being driven when it is confirmed that the detected obstacle and the vehicle will collide with each other, and to determine whether or not an expansion of the path generation region is possible when it is predicted for all of the plurality of path candidates that the obstacle and the vehicle will collide with each other to regenerate the plurality of path candidates within the expanded path generation region; and a controller selecting any one path candidate in which the collision between the obstacle and the vehicle does not occur among the plurality of path candidates and controlling the vehicle along the selected path.

BRIEF DESCRIPTION OF THE DRAWINGS

The above and other objects, features and advantages of the present disclosure will be more readily apparent from the following detailed description taken in conjunction with the accompanying drawings.

DETAILED DESCRIPTION

Figure 1:
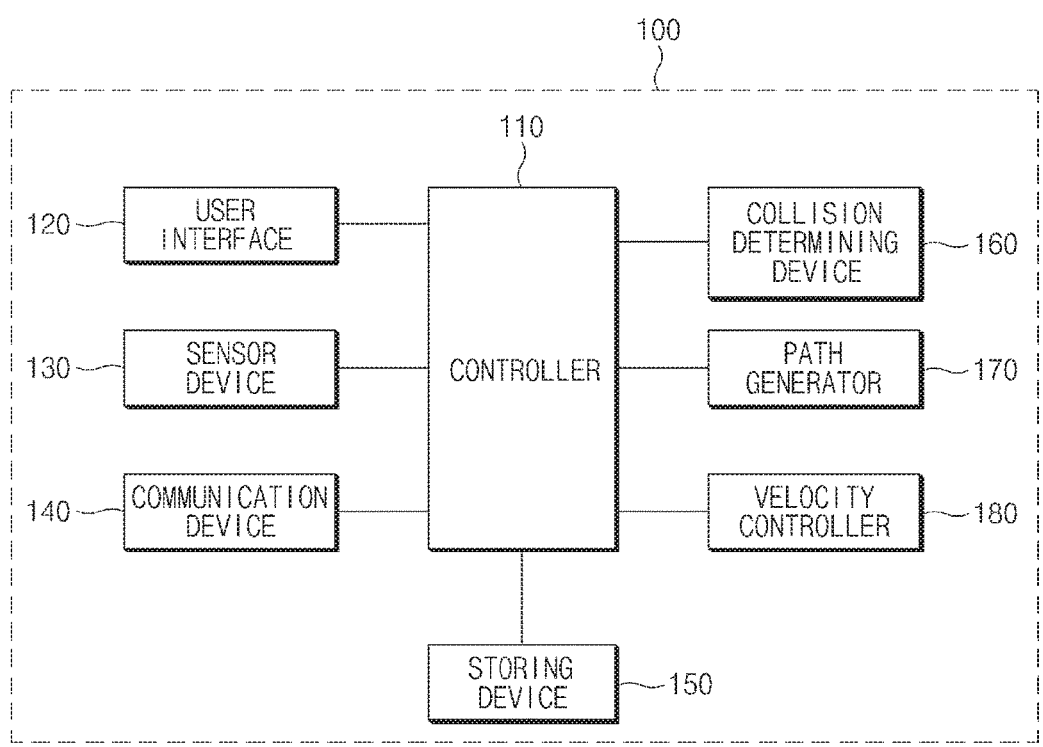
FIG. 1 is a diagram illustrating a configuration of an apparatus for controlling a path of an autonomous driving system according to the present disclosure.

It is to be noted that technical terms used in the specification are merely used for describing specific exemplary embodiments and are not intended to limit the present disclosure. In addition, unless defined otherwise in the specification, technical terms used in the specification are to be construed as meaning what they are generally understood by those skilled in the art to which the present disclosure pertains. In addition, when the technical terms used in the specification do not accurately indicate the technical spirit of the present disclosure, it is to be understood that the terms are replaced with the technical terms which may be accurately understood by those skilled in the art. Further, the general terms used in the present disclosure should be construed according to the terms defined by the dictionary or the context.

In addition, singular forms used in the present disclosure are intended to include plural forms unless the context clearly indicates otherwise. In the present disclosure, it is to be noted that the terms "comprising" or "including", and the like, are not construed as necessarily including every component or step described in the present disclosure, and some of the disclosed components or steps may not be included or additional components or steps may be further included.

In addition, terms including an ordinal number such as first, second, or the like, used in the present disclosure may be used to describe the components. However, these components are not limited to these terms. The terms are only used to distinguish one component from another component. For example, the 'first' component may be named the 'second' component, and vice versa, without departing from the scope of the present disclosure.

Hereinafter, exemplary embodiments of the present disclosure will be described in more detail with reference to the accompanying drawings. The same reference numerals will be used to describe the same or like components, independent of the reference numerals, and an overlapped description of the same components will be omitted.

In addition, when it is determined that the detailed description of the known technology related to the present disclosure may obscure the gist of the present disclosure, the detailed description thereof will be omitted. In addition, it is to be noted that the accompanying drawings are provided only in order to allow the spirit of the present disclosure to be easily understood and should not be construed as limiting the scope of the present disclosure.

FIG. 1 is a diagram illustrating a configuration of an apparatus for controlling a path of an autonomous driving system according to the present disclosure.

Referring to FIG. 1, the apparatus 100 for controlling a path (hereinafter, referred to also as 'path controller') of an autonomous driving system according to the present disclosure may be implemented in a vehicle. Here, the path controller 100 may be formed integrally with internal controlling units of the vehicle, or it may be implemented as a separate apparatus to be connected to the controlling units of the vehicle by a separate connection means.

Accordingly, referring to FIG. 1, the path controller 100 may include a controller 110, a user interface 120, a sensor device 130, a communication device 140, a storing device 150, a collision determining device 160, a path generator 170, and a velocity controller 180. Here, the controller 110 may process signals transferred between the respective components of the path controller 100.

The user interface 120 may include an input means for receiving a control command from a user, and an output means for outputting an operation state, a result, or the like of the path controller 100.

The input means may correspond to a key button, and may also correspond to a soft key implemented on the path controller 100 or a display included in the vehicle. Further, the input means may be an input means such as a mouse, a joy stick, a jog shuttle, a stylus pen, or the like.

The output means may include a display on which the operation state, the result, or the like of the path controller 100 is displayed, and may include a speaker that communicates the result using a sound.

In this case, the display may include a liquid crystal display (LCD), an organic light emitting diode (OLED), a flexible display, and the like.

The sensor device 130 includes a sensor capable of sensing an obstacle in the proximity of the vehicle during an autonomous driving of the vehicle by the autonomous driving system. Further, the sensor device 130 may be able to detect road landmarks such as a median strip, a curbstone, and a guardrail positioned around the vehicle, and may also detect lanes on a road.

Here, the sensor may include at least one of a laser sensor, an ultrasonic sensor, lidar, radar, and a camera. In addition to the sensors mentioned above, any sensor device 130 may be applied as long as it is a sensor capable of detecting surrounding objects.

If an obstacle in the proximity of the vehicle is detected, the sensor device 130 sends information on the detected obstacle to the collision determining device 160. For example, the sensor device 130 may detect information including a position and a velocity of the obstacle in front of the vehicle, a relative distance between the vehicle and the obstacle, and the like.

The communication device 140 may include a communication module that supports a communication interface with electronic components and/or control units included in the vehicle. As an example, the communication module may be communicatively connected to an instrument panel, a display panel, and the like included in the vehicle, thereby making it possible to transmit an operation state of the path controller 100 to the display. Further, the communication module may also transmit selected path information to a driving unit of the vehicle.

Here, the communication module may include a module that supports vehicle network communication such as controller area network (CAN) communication, local interconnect network (LIN) communication, flex-ray communication, and the like.

Further, the communication module may also include a module for wireless Internet connection or a module for short range communication. Here, a wireless Internet technology may include wireless LAN (WLAN), wireless broadband (Wibro), Wi-Fi, and the like. Further, a short range communication technology may include bluetooth, zigbee, ultra wideband (UWB), radio frequency identification (RFID), infrared data association (IrDA), and the like.

The storing device 150 may store data, programs, and the like that may be used to operate the path controller 100.

As an example, the storing device 150 may store condition information for an operation of the path controller 100, and may store an algorithm for generating path candidates or for avoiding a collision with the obstacle. Further, the storing device 150 may also store commands for controlling a velocity of the vehicle for avoiding a collision with the obstacle, and the like.

Here, the storing device 150 may include a storage medium such as a random access memory (RAM), a static random access memory (SRAM), a read-only memory (ROM), a programmable read-only memory (PROM), and an electrically erasable programmable read-only memory (EEPROM).

If the sensor device 130 detects the obstacle in the proximity of the vehicle during the autonomous driving of the vehicle, the collision determining device 160 determines whether or not the vehicle will collide with the detected obstacle if a reference path on which the vehicle is autonomously driven is maintained. In this case, the collision determining device 160 compares the reference path and behavior characteristics of the vehicle with the position of the obstacle to determine whether or not the vehicle will collide with the obstacle. The collision determining device 160 sends a result obtained by determining whether or not the vehicle will collide with the obstacle to the controller 110.

If the collision determining device 160 determines that the vehicle will not collide with the detected obstacle, the controller 110 allows the vehicle to maintain the reference path on which the vehicle is currently being autonomously driven.

If it is confirmed by the collision determining device 160 that the vehicle will collide with the detected obstacle, the controller 110 requests the path generator 170 to generate path candidates.

Accordingly, the path generator 170 generates a plurality of path candidates on which the vehicle may be driven according to the request of the controller 110. In this case, the path generator 170 generates the path candidates in the range without departing from the lane of the road on which the vehicle is being driven.

After the plurality of path candidates are generated regarding the road on which the vehicle is being driven, the collision determining device 160 calculates a degree of collision risk with the obstacle for each of the plurality of path candidates. The collision determining device 160 sends information on the calculated degree of collision risk for each path candidate to the controller 110. The information on the degree of collision risk for each path candidate sent to the controller 110 may be used to select any one path.

In other words, the controller 110 may select a path having the lowest degree of collision risk among the plurality of path candidates generated by the path generator 170. In this case, the controller 110 controls the autonomous driving of the vehicle in accordance with the selected path. In the case in which the autonomous driving system is implemented independently from the controller 110, the controller 110 may also provide information on the selected path to the autonomous driving system connected through the communication device 140.

When the vehicle is autonomously driven along the selected path, the velocity controller 180 may generate a velocity profile for an obstacle positioned in the proximity of the selected path and may send the velocity profile to the controller 110. As an example, the velocity controller 180 calculates a collision prediction width (dcollision), particularly, a width from a tire of the vehicle to the obstacle, and determines a velocity adjustment ratio ($\alpha$) of the corresponding vehicle based on the collision prediction width (dcollision). Here, the velocity adjustment ratio ($\alpha$) is proportional to the collision prediction width (dcollision), and has a value ($0<\alpha<1$) between 0 and 1.

The velocity controller 180 determines a value obtained by multiplying a set velocity of the vehicle which is autonomously being driven on the corresponding path with the determined velocity adjustment ratio ($\alpha$), to reach a target velocity of the vehicle. In this case, when the position of the vehicle being autonomously driven is closer to the obstacle, the velocity adjustment ratio ($\alpha$) approaches 0, thereby decreasing a value of the target velocity of the vehicle.

Accordingly, the velocity controller 180 may generate the velocity profile in relation to the target velocity Vtarget of the vehicle corresponding to the collision prediction width (dcollision).

As a result, the controller 110 may control the velocity of the vehicle while the vehicle which is being driven on the path selected based on the velocity profile for the obstacle passes around the obstacle. In the case in which the autonomous driving system is implemented independently from the controller 110, the controller 110 may also provide the velocity profile for the obstacle positioned in the proximity of the selected path to the autonomous driving system connected through the communication device 140.

When it is predicted that all of the plurality of path candidates generated by the path generator 170 collide with the obstacle, the controller 110 may request the path generator 170 to again generate the path candidates. In this case, the path generator 170 determines whether or not a path generation region for a driving road may be expanded. In other words, if there is an extra region such as a shoulder on the road, or if another vehicle does not exist in an adjacent lane, the path generator 170 may recognize the corresponding region as an expandable region. Accordingly, the path generator 170 increases a path generation width of the path generation region, and again generates the path candidate groups in relation to the increased path generation width.

In this case, the collision determining device 160 calculates a degree of collision risk with the obstacle for each of the plurality of path candidates which are again generated and sends the corresponding information to the controller 110, and the controller 110 selects a path having the lowest degree of collision risk among the plurality of path candidate groups which are again generated by the path generator 170.

When the vehicle is autonomously driven along the selected path, the velocity controller 180 may generate a velocity profile for an obstacle positioned in the proximity of the corresponding path and may send the velocity profile to the controller 110, and the controller 110 may control the velocity of the vehicle based on the velocity profile for the obstacle while the vehicle which is being driven on the selected path passes around the obstacle. In the case in which the autonomous driving system is implemented independently from the controller 110, the controller 110 may also provide the velocity profile for the obstacle positioned in the proximity of the selected path to the autonomous driving system connected through the communication device 140.

On the other hand, when it is predicted that all of the plurality of path candidates generated by the path generator 170 collide with the obstacle, and when the expansion of the path generation region for the driving road is impossible, the controller 110 allows the vehicle to maintain the reference path on which the vehicle is currently being autonomously driven.

In this case, the velocity controller 180 generates a velocity profile for an obstacle positioned in the proximity of the reference path. In this case, the velocity controller 180 may generate the velocity profile so that the velocity of the vehicle is gradually decreased when the vehicle approaches the obstacle, and the vehicle is stopped when proximately arriving at a position at which the obstacle is disposed.

As a result, the controller 110 may control the velocity of the vehicle which is being driven along the reference path based on the velocity profile generated by the velocity controller 180. In the case in which the autonomous driving system is implemented independently from the controller 110, the controller 110 may also provide the velocity profile for the obstacle positioned in the proximity of the reference path to the autonomous driving system connected through the communication device 140.

Figure 2:
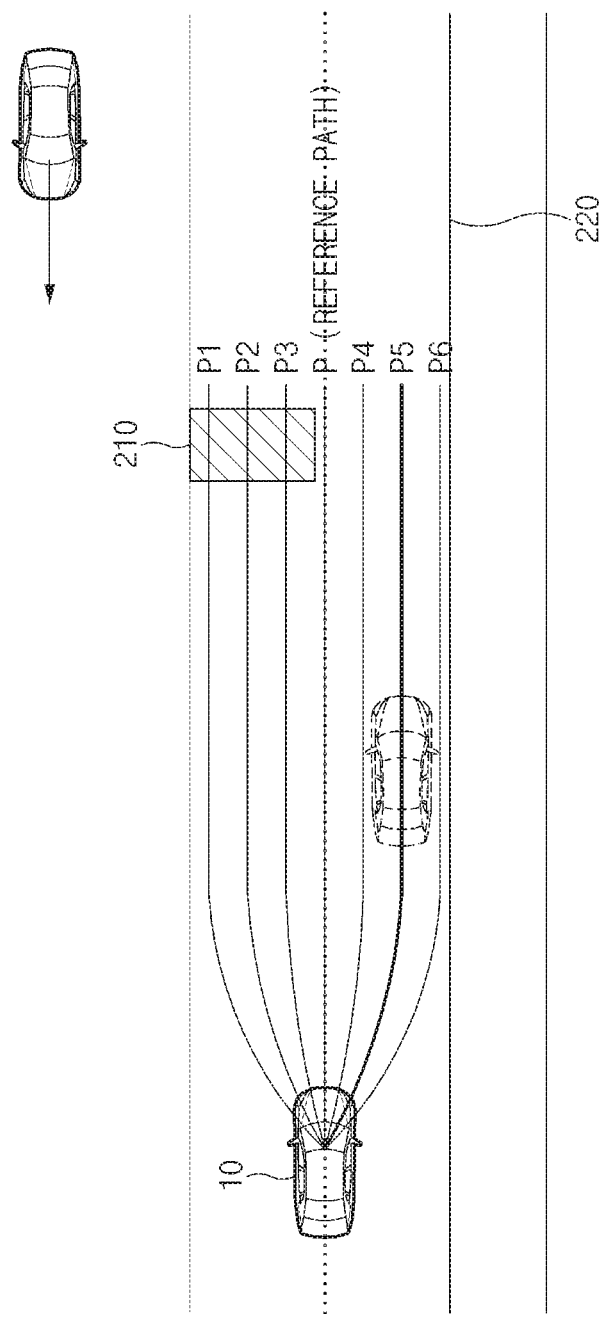
FIG. 2 is a diagram illustrating a first exemplary embodiment for an operation of the apparatus for controlling a path of an autonomous driving system according to the present disclosure.

FIG. 2 is a diagram illustrating a first exemplary embodiment for an operation of the apparatus for controlling a path of an autonomous driving system according to the present disclosure.

Referring to FIG. 2, if it is predicted that a vehicle 10 and an obstacle 210 will collide with each other while the vehicle 10 is driven on a reference path P, the path controller defines a road width based on a lane 220 as a path generation region, and generates a plurality of path candidates P1, P2, P3, P4, P5, and P6 which may be generated within the defined path generation region.

In this case, the path controller may calculate a degree of collision risk with the obstacle 210 for each of the generated path candidates P1, P2, P3, P4, P5, and P6, and may select any one path based on the calculated degree of collision risk.

In this case, the path controller may select a path having the lowest degree of collision risk. If there are a plurality of paths having a low degree of collision risk, the path controller may select the path P5 on which the vehicle may be safely driven in the range without departing from a reference lane 220 to allow the vehicle to be driven on the selected path P5.

The path controller may determine a target velocity based on a collision prediction width between the vehicle 10 and the obstacle 210 while the vehicle 10 is driven along the selected path P5, and may adjust the set velocity of the vehicle 10 according to the determined target velocity.

Figure 3:
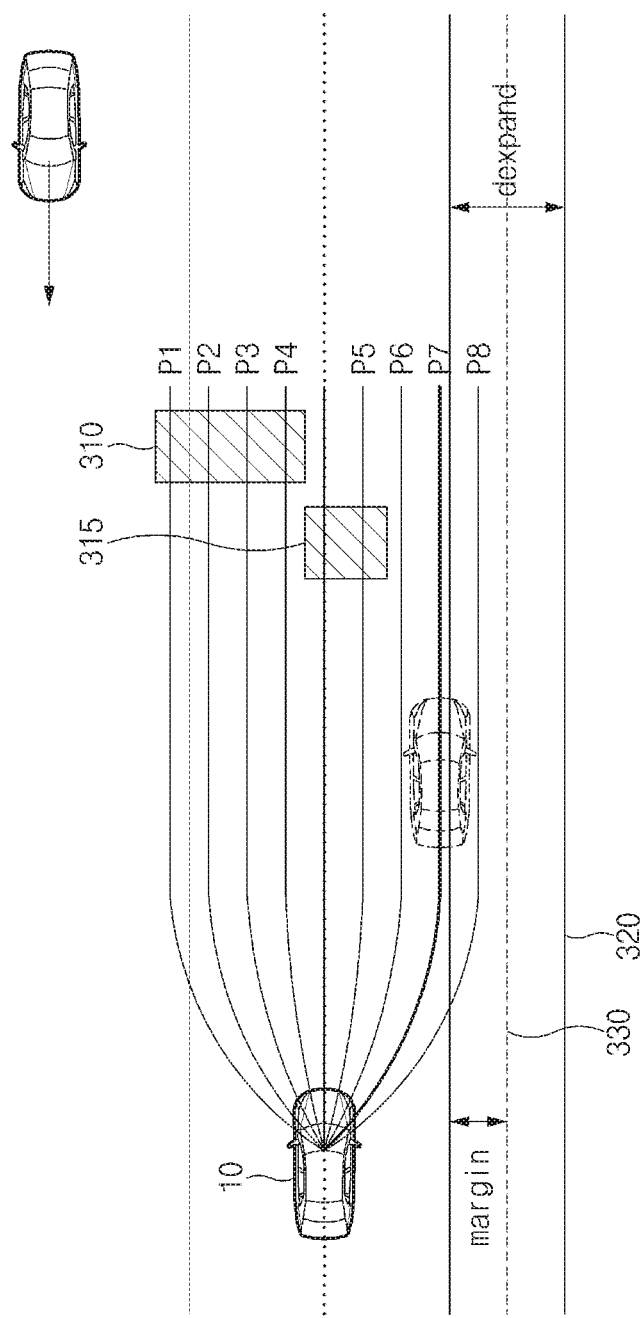
FIGS. 3 and 4 are diagrams illustrating a second exemplary embodiment for an operation of the apparatus for controlling a path of an autonomous driving system according to the present disclosure.
Figure 4:
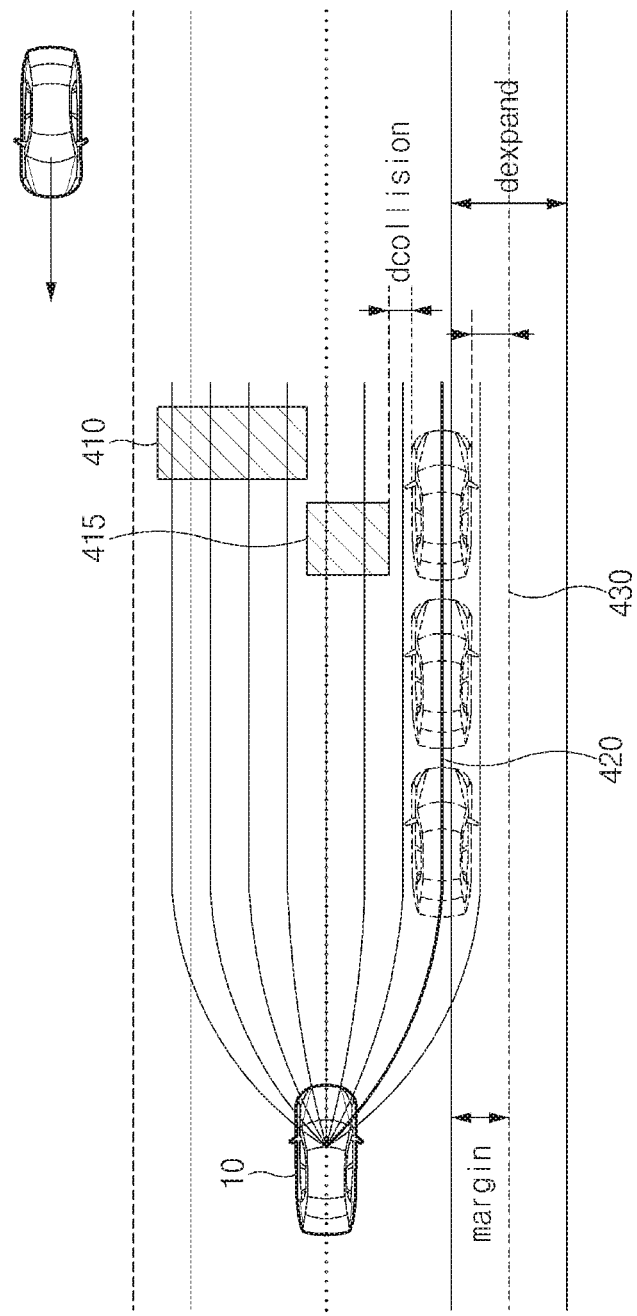

FIGS. 3 and 4 are diagrams illustrating a second exemplary embodiment for an operation of the apparatus for controlling a path of an autonomous driving system according to the present disclosure.

Referring to FIG. 3, if it is predicted that a vehicle 10 and obstacles 310 and 315 will collide with each other while the vehicle 10 is driven on the reference path P, the path controller defines a road width based on a lane as a path generation region, and generates a plurality of path candidates which may be generated within the defined path generation region.

In this case, if it is predicted that all of the plurality of generated path candidates will collide with the obstacles 310 and 315, the path controller determines whether or not an expansion for the path generation width of the path generation region is possible, and increases the path generation width when there is an expandable region.

As an example, the path controller may determine a region from the lane of the road on which the vehicle is being driven to a road structure positioned at an outer region of the lane as the expandable region. Accordingly, the path controller may increase an existing path generation region as much as the expandable region, and may generate the plurality of path candidate groups based on a path generation width of the increased path generation region.

In this case, the path controller may determine the path generation width in relation to a virtual line 330 positioned inside as much as a half (½) of a vehicle width from an outer boundary line 320 of the expandable region, and generate path candidates P1, P2, P3, P4, P5, P6, P7, and P8 within the determined path generation width. In other words, the path controller may determine a distance obtained by subtracting (vehicle width/2) from a road width (dexpand) of the expandable region as a margin, may increase the existing path generation width as much as a distance corresponding to the margin, and may then generate the path candidate groups based on the increased path generation width.

The path controller may calculate a degree of collision risk with the obstacles 310 and 315 for each of the generated path candidates P1, P2, P3, P4, P5, P6, P7, and P8, and may select any one path based on the calculated degree of collision risk.

In this case, the path controller may select a path having the lowest degree of collision risk. If there are a plurality of paths having a low degree of collision risk, the path controller may select the path P7 on which the vehicle may be safely driven in the range without departing from the defined reference lane 330 to allow the vehicle to be driven on the selected path P7.

As shown in FIG. 4, the path controller may determine a target velocity based on a collision prediction width (dcollision) between the vehicle 10 and obstacles 410 and 415 or between the vehicle 10 and a reference lane 430 while the vehicle 10 is driven along a selected path 420, as illustrated in FIG. 4, and may adjust the set velocity of the vehicle 10 according to the determined target velocity.

Although the exemplary embodiments of FIGS. 3 and 4 describe that the region from the lane of the road on which the vehicle is being driven to the road structure positioned in the outer region of the lane is determined as the expandable region and the path candidate groups are generated, by way of example, it is also possible to determine the expandable region based on another lane positioned in the outer region of the lane of the road on which the vehicle is being driven, that is, a lane adjacent to the adjacent lane to generate the path candidates.

If there is an expandable region based on the lane adjacent to the adjacent lane of the lane on which the vehicle is being driven, and an expandable region based on a road structure positioned in an opposite direction, the path controller may generate the path candidate groups by reflecting all of the expandable regions in both directions, and may also select a path having the lowest degree of collision risk among the generated path candidates to allow the vehicle to be driven on the selected path.

Figure 5:
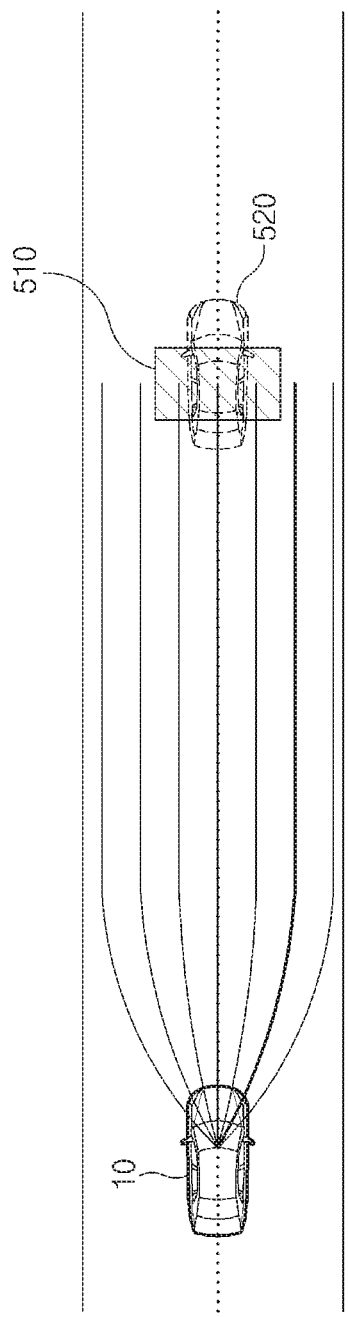
FIG. 5 is a diagram illustrating a third exemplary embodiment for an operation of the apparatus for controlling a path of an autonomous driving system according to the present disclosure.

FIG. 5 is a diagram illustrating a third exemplary embodiment for an operation of the apparatus for controlling a path of an autonomous driving system according to the present disclosure.

Referring to FIG. 5, if it is predicted that a vehicle 10 and an obstacle 510 will collide with each other while the vehicle 10 is driven on the reference path, the path controller defines a path generation region based on a lane, and generates a plurality of path candidates within a path generation width of the defined path generation region. In this case, the path controller may calculate a degree of collision risk with the obstacle 510 for each of the generated path candidates, and may select any one path based on the calculated degree of collision risk.

If it is predicted that all of the plurality of generated path candidate groups will collide with the obstacle 510, the path controller determines whether or not an expansion for the path generation width of the path generation region is possible. However, as illustrated in FIG. 5, in the case in which the expansion of the path generation region for a road on which the vehicle is driven is impossible, the path controller maintains the reference path on which the vehicle is currently being driven.

In this case, the path controller generates a virtual target 520 corresponding to the obstacle 510 to be disposed in a region in which the obstacle 510 is positioned, and defines the virtual target 520 as a target of the autonomous driving to allow the vehicle to be driven. In this case, if the vehicle 10 arrives at the region in which the virtual target 520 is positioned, the path controller stops the vehicle 10, thereby making it possible to prevent the collision with the obstacle 510.

An operation flow of the apparatus for controlling a path according to the present disclosure having the configuration as described above will be described below in detail.

Figure 6:
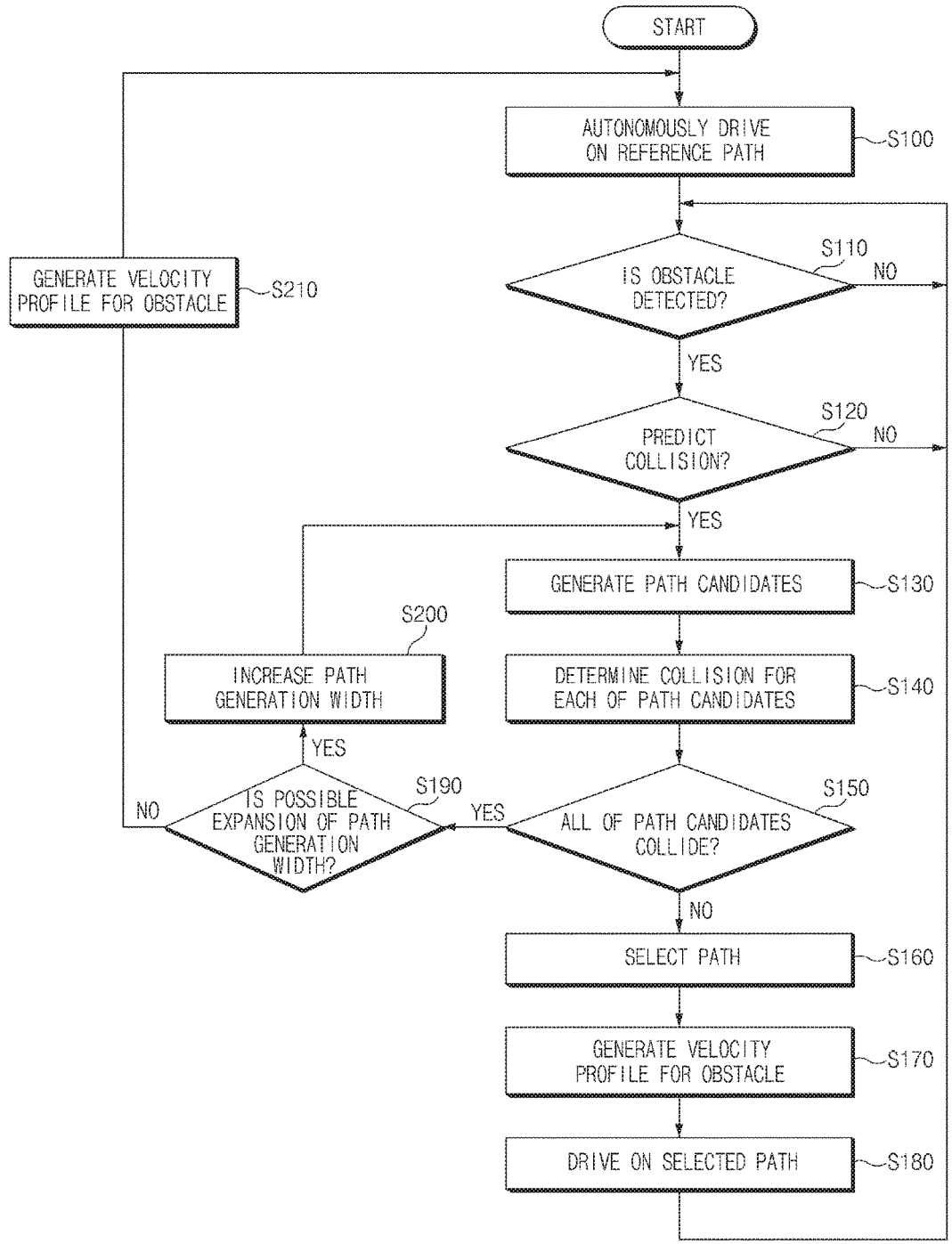
FIG. 6 is a diagram illustrating an operation flow for a method for controlling a path of an autonomous driving system according to the present disclosure.

FIG. 6 is a diagram illustrating an operation flow for a method for controlling a path of an autonomous driving system according to the present disclosure.

As illustrated in FIG. 6, if an obstacle is detected while a vehicle is autonomously driven along a reference path (S100, S110), a path controller determines whether or not the detected obstacle and the vehicle will collide with each other. If it is predicted that the obstacle and the vehicle will collide with each other (S120), the path controller generates a plurality of path candidates which are movable within a path generation region of a crossroad on which the vehicle is being driven (S130).

In this case, the path controller determines whether or not the corresponding obstacle and the vehicle will collide with each other for each of the path candidates generated in 'S130' (S140).

If it is not predicted for all of the path candidate groups that the obstacle and the vehicle will collide with each other in 'S140' (S150), the path controller may select any one path among path candidates for which the collision is not predicted (S160).

Here, the path controller may determine a target velocity of the vehicle according to a collision prediction width between the obstacle and the vehicle, for example, a width between the obstacle and a tire of the vehicle, and may generate a velocity profile for the obstacle using the determined target velocity (S170).

Therefore, the path controller may adjust a set velocity of the vehicle according to the velocity profile generated in 'S170' based on the path selected in 'S160' to allow the vehicle to be driven (S180).

If it is predicted for all of the path candidate groups that the obstacle and the vehicle will collide with each other in 'S150', the path controller determines whether or not an expansion for a path generation width of a path generation region is possible. If the expansion is possible (S190), the path controller increases the path generation width of the path generation region as much as a path generation width of an expandable region based on at least one of an adjacent lane and a road structure (S200), and re-performs 'S130' within the path generation region which is expanded as much as the path generation width of the expandable region to again generate the path candidates.

On the other hand, if the expansion for the path generation width of the path generation region is impossible according to a road environment in 'S190', the path controller generates the velocity profile for the obstacle (S210), and adjusts the set velocity to allow the vehicle to perform the autonomous driving along the reference path.

In 'S210', the path controller generates and disposes a virtual position-fixed target corresponding to the obstacle, and allows the vehicle to be driven based on the corresponding virtual position-fixed target as a target, thereby making it possible to generate the velocity profile so that the vehicle is stopped when the vehicle finally arrives at the virtual position-fixed target.

The above-mentioned operations may be directly implemented by hardware and software module executed by a processor, or a combination of two. The software module may be resided on a storing medium (i.e., a memory and/or a storage) such as a RAM memory, a flash memory, a ROM memory, an erasable programmable read only memory (EPROM) memory, an electrically erasable programmable read only memory (EEPROM) memory, a register, a hard disk, a removable disk, or a compact disc-read only memory (CD-ROM). An exemplary storing medium may be coupled to the processor, and the processor may read information from the storing medium and write the information into the storing medium. Alternatively, the storing medium may be integral with the processor. The processor and the storing medium may be resided within an application specific integrated circuit (ASIC). The ASIC may be resided within a user terminal. Alternatively, the processor and the storing medium may also be resided within the user terminal as an individual component.

As described above, according to the exemplary embodiments of the present disclosure, an avoidance path is generated and selected by considering all of road situations and behavior characteristics of the vehicle which are varied in real time as well as a state of the obstacle, thereby making it possible to provide the autonomous driving service having higher stability and higher reliability.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A method for controlling a path of an autonomous driving system, the method comprising steps of:
   determining whether or not an obstacle and an autonomously driven vehicle will collide with each other when a sensor detects an obstacle in a proximity of the vehicle while the vehicle is being autonomously driven along a reference path;
   generating a plurality of path candidates within a path generation region of a road on which the vehicle is being driven when it is determined that the detected obstacle and the vehicle will collide with each other;
   determining whether or not an expansion of the path generation region is possible based on a road environment, expanding the path generation region, and regenerating the plurality of path candidates within the expanded path generation region when there is no path candidate in which the collision between the obstacle and the vehicle does not occur among the plurality of path candidates;
   selecting a path from among the path candidates in which the collision between the obstacle and the vehicle does not occur when there are path candidates in which the collision between the obstacle and the vehicle does not occur among the plurality of path candidates,
   after the step of selecting any one path of the path candidates to allow the vehicle to be-driven-along the selected path, steps of:
   calculating a collision prediction width between the vehicle and the obstacle;
   determining a velocity adjustment ratio of the vehicle to be proportional to the collision prediction width;
   determining a target velocity of the vehicle by applying the determined velocity adjustment, and
   generating a velocity profile based on the target velocity of the vehicle.

2. The method according to claim 1, wherein in the step of determining whether or not the expansion of the path generation region is possible, it is determined based on at least one of a lane adjacent to an outer region of a lane of a road on which the vehicle is being driven and a road structure exceeding a preset reference value.

3. The method according to claim 2, wherein in the step of expanding the path generation region, a path generation width is determined in relation to inside as much as a half (½) of a vehicle width from an outer boundary line of the expandable region, and the path generation region is expanded as much as the determined path generation width.

4. The method according to claim 1, wherein the step of selecting any one path of the path candidates to allow the vehicle to be driven along the selected path includes selecting a path having the lowest degree of collision risk between the obstacle and the vehicle among the path candidates in which the collision does not occur.

5. The method according to claim 1, further comprising a step of adjusting the set velocity of the vehicle according to the velocity profile while the vehicle passes around the obstacle.

6. The method according to claim 1, further comprising, after the step of generating the plurality of path candidates, a step of selecting any one path of the path candidates in which the collision does not occur based on a position of the obstacle and characteristics information of the vehicle to allow the vehicle to be driven along the selected path when there are path candidates in which the collision between the obstacle and the vehicle does not occur.

7. The method according to claim 1, further comprising, after the step of regenerating the plurality of path candidate groups, a step of setting the obstacle as a target when there is no path candidate in which the collision between the obstacle and the vehicle does not occur among the plurality of path candidates, and maintaining the reference path which is currently driven as a driving path of the vehicle.

8. The method according to claim 7, wherein in the step of setting the obstacle as the target, a virtual position-fixed target corresponding to the obstacle is generated and is disposed at a position of the obstacle, and the virtual position-fixed target is set as the target.

9. An apparatus for controlling a path of an autonomous driving system, the apparatus comprising:
   a collision determining device configured to determine whether or not a detected obstacle and a vehicle will collide with each other when a sensor sensing an obstacle in a proximity of the vehicle detects the obstacle while the vehicle is autonomously driven along a reference path, and determining whether or not the obstacle and the vehicle will collide with each other based on each of a plurality of path candidates generated within a road on which the vehicle is being driven;
   a path generator configured to generate a plurality of path candidates within a path generation region of the road on which the vehicle is being driven when it is confirmed that the detected obstacle and the vehicle will collide with each other, and to determine whether or not an expansion of the path generation region is possible when it is predicted for all of the plurality of path candidates that the obstacle and the vehicle will collide with each other to regenerate the plurality of path candidates within the expanded path generation region; and
   a controller selecting any one path candidate in which the collision between the obstacle and the vehicle does not occur among the plurality of path candidates and controlling the vehicle along the selected path, and
   a velocity controller configured to calculate a collision prediction width between the vehicle and the obstacle, determine a velocity adjustment ratio of the vehicle to be proportional to the collision prediction width, determine a target velocity of the vehicle by applying the determined velocity adjustment ratio to a set velocity of the vehicle, and generate a velocity profile based on the target velocity of the vehicle.

* * * * *